US012141841B2

(12) United States Patent
Portman et al.

(10) Patent No.: US 12,141,841 B2
(45) Date of Patent: Nov. 12, 2024

(54) GENERATING ACCOMPANYING TEXT CREATIVE

(71) Applicant: Zeta Global Corp., New York, NY (US)

(72) Inventors: Danny Portman, Atlanta, GA (US); Zachary D. Jones, Atlanta, GA (US)

(73) Assignee: Zeta Global Corp., New York, NY (US)

( * ) Notice: Subject to any disclaimer, the term of this patent is extended or adjusted under 35 U.S.C. 154(b) by 278 days.

(21) Appl. No.: 17/731,023

(22) Filed: Apr. 27, 2022

(65) Prior Publication Data

US 2022/0351251 A1 Nov. 3, 2022

Related U.S. Application Data

(60) Provisional application No. 63/183,211, filed on May 3, 2021, provisional application No. 63/182,683, filed on Apr. 30, 2021.

(51) Int. Cl.
*G06V 10/82* (2022.01)
*G06Q 30/0251* (2023.01)
*G06V 10/774* (2022.01)

(52) U.S. Cl.
CPC ....... *G06Q 30/0269* (2013.01); *G06V 10/774* (2022.01); *G06V 10/82* (2022.01)

(58) Field of Classification Search
CPC .................................................. G06Q 30/0269
See application file for complete search history.

(56) References Cited

U.S. PATENT DOCUMENTS

| | | | |
|---|---|---|---|
| 2013/0246322 A1* | 9/2013 | De Sousa Webber | G06N 3/088 706/18 |
| 2018/0191849 A1* | 7/2018 | Xu | H04L 69/22 |
| 2020/0104710 A1* | 4/2020 | Vasudevan | G06N 3/045 |
| 2020/0265315 A1* | 8/2020 | Zoph | G06N 3/08 |
| 2021/0034973 A1* | 2/2021 | Xu | G06N 3/08 |
| 2021/0279511 A1* | 9/2021 | Gordon | G06V 10/774 |

* cited by examiner

*Primary Examiner* — Edward Park
(74) *Attorney, Agent, or Firm* — Schwegman Lundberg & Woessner, P.A.

(57) ABSTRACT

A method comprises: collecting data including combinations of images and accompanying text and user feedback of the combinations; building training data sets based on the collected data; training a plurality of neural networks using the training data; generating a creative feature vector based on a specified image using a first network of the trained plurality of neural networks; generating a target audience vector based on a specified target audience using a second network of the trained plurality of networks; generating a sequence of words based on the vectors using a third network of the plurality of trained neural networks; and transmitting the generated sequence of words and the specified image to the target audience over a network.

20 Claims, 10 Drawing Sheets

GENERATING ACCOMPANYING TEXT CREATIVE

CROSS REFERENCE TO RELATED APPLICATIONS

This application claims the benefit of priority, under 35 U.S.C. Section 119(e), to U.S. Provisional Patent Application No. 63/182,683 filed Apr. 30, 2021, and to U.S. Provisional Patent Application No. 63/183,211 filed May 3, 2021, which are hereby incorporated by reference herein in their entirety.

BACKGROUND

Digital advertisements often comprise an image accompanied by a short segment of text. Typically, an advertiser will carefully handcraft the text to appeal to a wide audience. In other cases, an advertiser may draft several candidate messages and allow their advertising platform to automatically select the one which performs best in small-scale trials. However, it has become increasingly popular for advertisers to deliver ads to narrow "target audiences" which are specified by demographic or behavioral traits. The broad, handcrafted marketing messages often fail to maximize engagement with narrow target audiences.

SUMMARY

A method comprises: collecting data including combinations of images and accompanying text and user feedback of the combinations; building training data sets based on the collected data; training a plurality of neural networks using the training data; generating a creative feature vector based on a specified image using a first network of the trained plurality of neural networks; generating a target audience vector based on a specified target audience using a second network of the trained plurality of networks; generating a sequence of words based on the vectors using a third network of the plurality of trained neural networks; and transmitting the generated sequence of words and the specified image to the target audience over a network.

In addition, a non-transitory computer-readable medium has stored thereon instructions to cause a computer to execute the method. An apparatus comprises: a processor; and a non-transitory memory having stored thereon instructions to cause the processor to execute the method.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
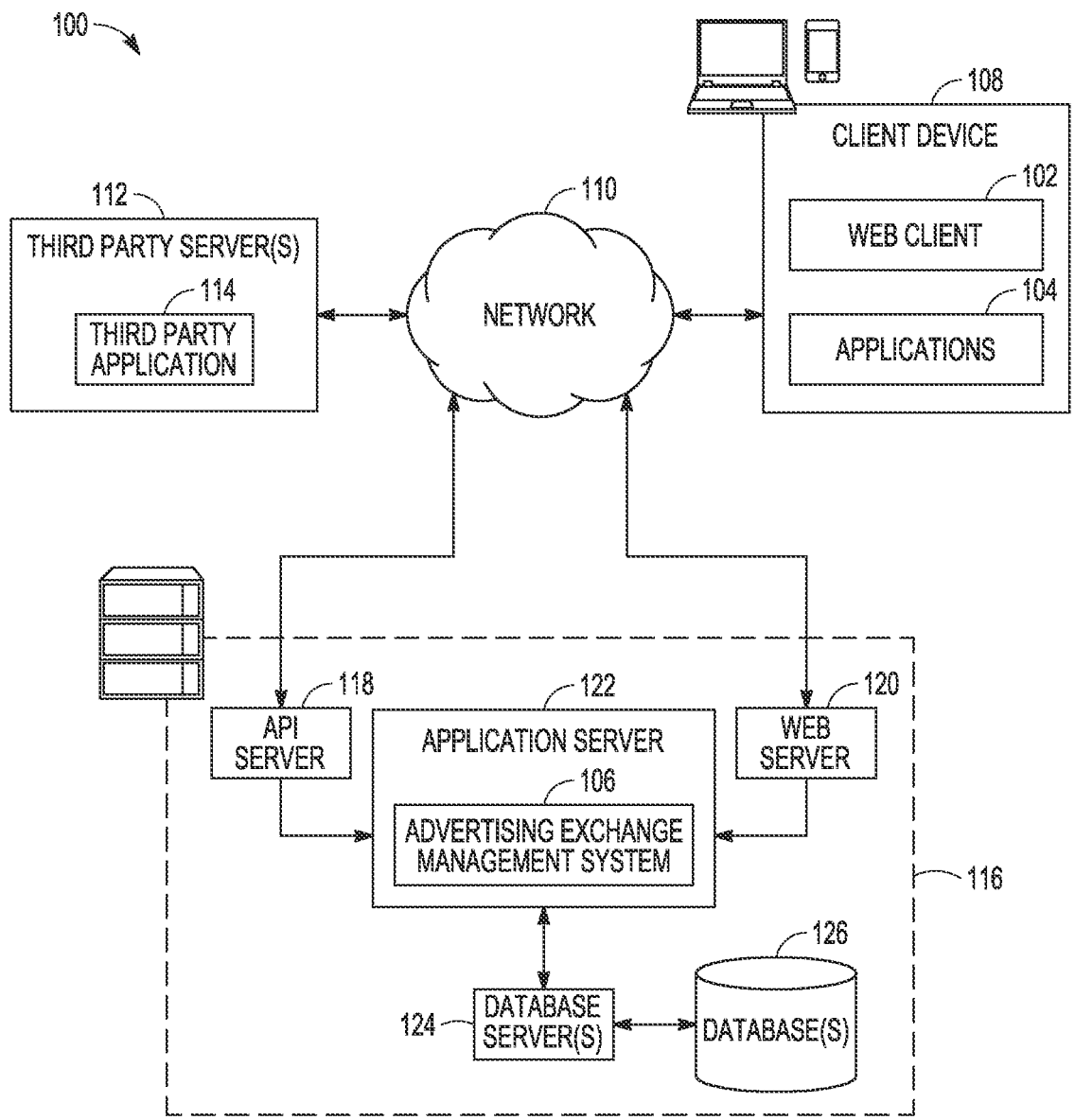
FIG. 1 is a diagrammatic representation of a networked environment in which the present disclosure may be deployed, in accordance with some example embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiment of the inventive subject matter. It will be evident, however, to those skilled in the art that embodiments of the inventive subject matter can be practiced without these specific details. In general, well-known instruction instances, protocols, structures, and techniques have not been shown in detail. It should be understood by those with skill in the art may combine elements from various embodiments in practicing the present invention.

In general, "INVENTORY" in this context may be a term for a unit of advertising space, such as a magazine page, television airtime, direct mail message, email messages, text messages, telephone calls, etc. Advertising inventory may be advertisements a publisher has available to sell to an advertiser. In certain embodiments, advertising inventory may refer to a number of email advertisements being bought and/or sold. The terms INVENTORY and ADVERTISING INVENTORY may be used interchangeably. For email marketing campaigns, advertising inventory is typically an email message.

A "PUBLISHER" in this context may be an entity that sells advertising inventory, such as those produced by the systems and methods herein, to their email subscriber database. An advertiser may be a buyer of publisher email inventory. Examples of advertisers may include various retailers. A marketplace may allow advertisers and publishers to buy and sell advertising inventory. Marketplaces, also called exchanges or networks, may be used to sell display, video, and mobile inventory. In certain embodiments, a marketplace may be an email exchange/email marketplace. An email exchange may be a type of marketplace that facilitates buying and/or selling of inventory between advertisers and publishers. This inventory may be characterized based on customer attributes used in marketing campaigns. Therefore, an email exchange may have inventory that can be queried by each advertiser. This may increase efficiency of advertiser's when purchasing inventory. A private network may be a marketplace that has more control and requirements for participation by both advertisers and publishers.

An "INDIVIDUAL RECORD" or "PROSPECT" in this context may be at least one identifier of a target. In certain embodiments, the individual record/prospect may be identified by a record identification mechanism, such as a specific email address (individual or household) that receives an email message.

An "AUDIENCE" in this context may be a group of records, which may be purchased as inventory. In certain embodiments, an audience may be a group of records selected from publisher databases of available records such as a group of consumers and their affiliated profiles. The subset of selected records may adhere to a predetermined set of criteria, such as common age range, common shopping habits, and/or similar lifestyle situation (i.e., stay-at-home mother). Advertisers generally select the predetermined set of criteria when they are making an inventory purchase.

"CARRIER SIGNAL" in this context in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CURRENT DEVICE" in this context refers to any machine that interfaces with a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an internet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling of the client device to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO technology, General Packet Radio Service (GPRS) technology, Enhanced. Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"COMPONENT" in this context refers to a device, a physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations that may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor, Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured. (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may, be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed, among the processors, not only residing within a single machine, but deployed across a number of machines. In some example embodiments, the processors or processor-implemented components may be located in a single geographic location (e.g., within a home environment, an office environment, or a server form). In other example embodiments, the processors or processor-implemented components may be distributed across a number of geographic locations.

"MACHINE-READABLE MEDIUM" in this context refers to a component, a device, or other tangible media able to store instructions and data temporarily or permanently, and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)); and/or any suitable combination thereof. The term "machine-readable medium" should be taken to include a single medium or multiple media (e.g., a centralized or distributed database, or associated caches and servers) able to store instructions. The term "machine-readable machine" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of an application 104, are hosted and execute on the client device 108. The networked system 116 includes an application server 122, which in turn hosts an advertising exchange management system 106 for management of an advertising exchange using email data according to one embodiment. The advertising exchange management system 106 provides a number of functions and services to the application 104 that accesses the networked system 116. The application 104 also provides a number of interfaces described herein, which present output of tracking and analysis operations to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program Interface (API) server 118 and a web server 120 are coupled, and provide programmatic and web interfaces respectively, to the application server 122. The application server 122 hosts the advertising exchange management system 106, which includes components or applications. The application server 122 is, in turn, shown to be coupled to a database server 124 that facilitates access to information storage repositories (e.g., a database 126). In an example embodiment, the database 126 includes storage devices that store information accessed and generated by the advertising exchange management system 106.

Additionally, a third-party application 114, executing on a third-party server(s) 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., advertising exchange management system 106) via the web interface supported by the web server 120. Similarly, the application 104 (e.g., an "app") accesses the various services and functions provided by the advertising exchange management system 106 via the programmatic interface provided by the API server 118. The application 104 may be, for example, an "app" executing on the client device 108, such as an IOS™ or ANDROID™ OS application to enable a user to access and input data on the networked system 116 in an offline manner, and to perform batch-mode communications between the application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The advertising exchange management system 106 could also be implemented as a standalone software program, which does not necessarily have networking capabilities.

Figure 2:
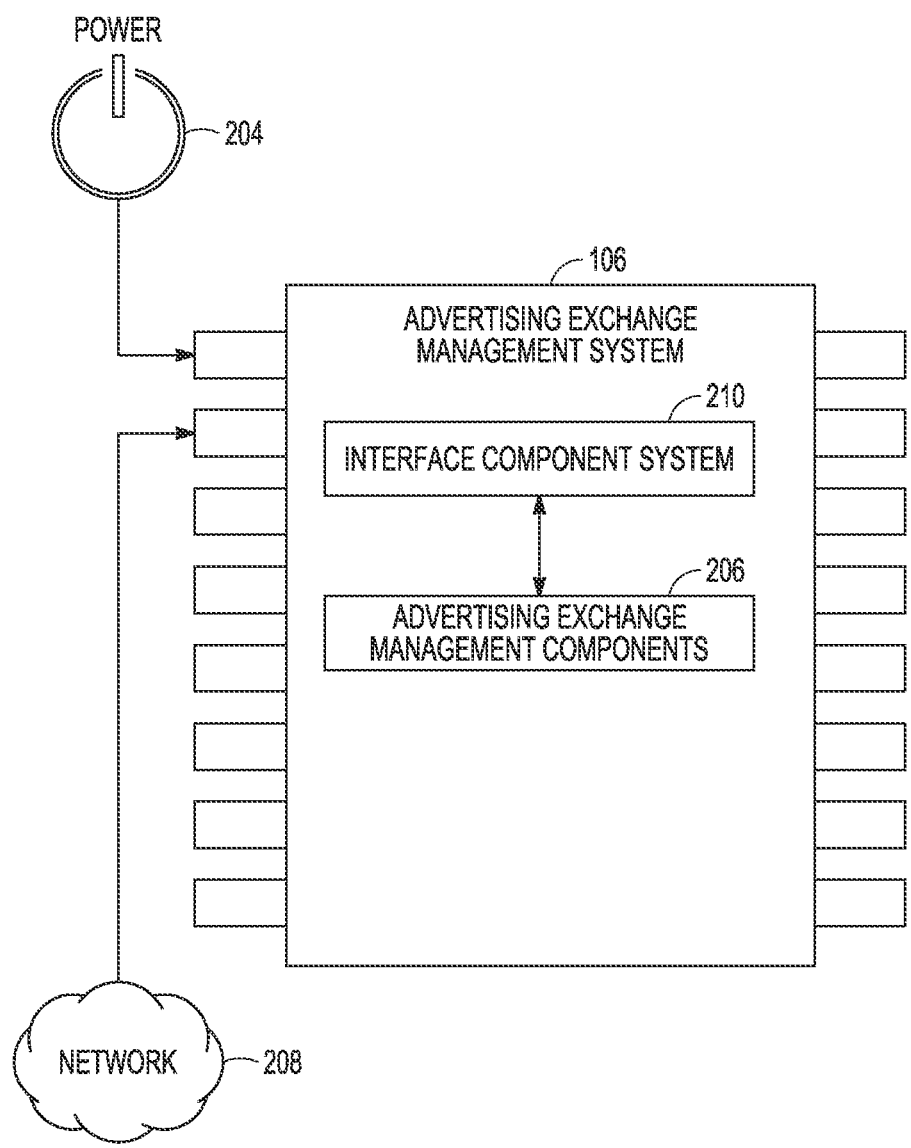
FIG. 2 is a diagrammatic representation of an advertising exchange management system, in accordance with some example embodiments.

FIG. 2 is a block diagram showing architectural details of an advertising exchange management system 106, according to some example embodiments. Specifically, the advertising exchange management system 106 is shown to include an interface component 210 by which the advertising exchange management system 106 communicates (e.g., over a network 208) with other systems within the SaaS network architecture 100.

The interface component 210 is collectively coupled to one or more advertising exchange management components 206 that operate to provide specific aspects of management of an advertising exchange using email data, in accordance with the methods described further below with reference to the accompanying drawings.

Figure 3:
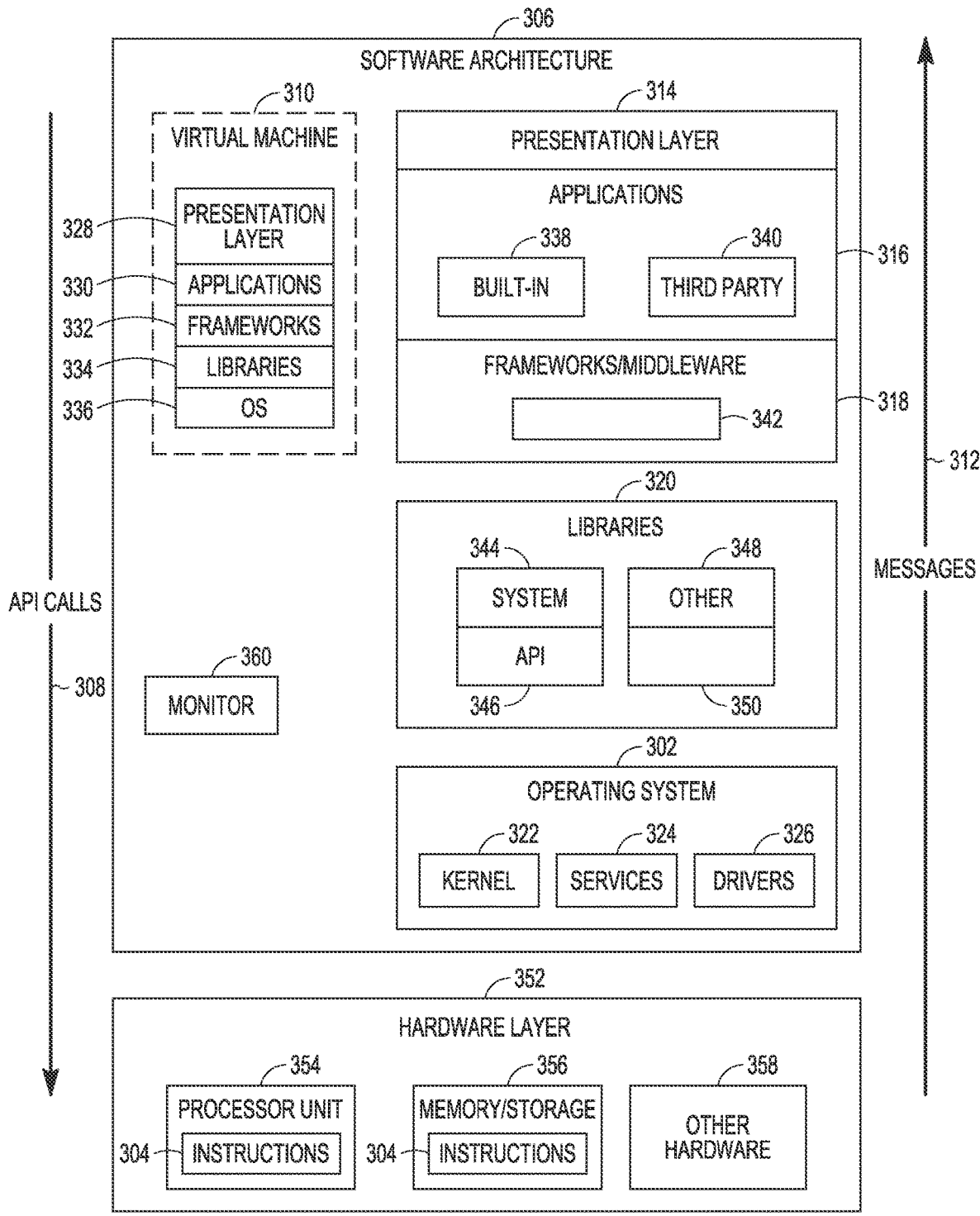
FIG. 3 is block diagram showing a software architecture within which the present disclosure may be implemented, in accordance with some example embodiments.

FIG. 3 is a block diagram illustrating an example software architecture 306, which may be used in conjunction with various hardware architectures herein described, FIG. 3 is a non-limiting example of a software architecture 306 and it will be appreciated that many other architectures may be implemented to facilitate the functionality described herein. The software architecture 306 may execute on hardware such as a machine 400 of FIG. 4 that includes, among other things, processors 404, memory/storage 406, and I/O components 418. A representative hardware layer 352 is illustrated and can represent, for example, the machine 400 of FIG. 4. The representative hardware layer 352 includes a processing unit 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke application programming interface (API) API calls 308 through the software stack and receive messages 312 in response to the API calls 308, The layers illustrated are representative in nature, and not all software architectures have all layers. For example, some mobile or special-purpose operating systems may not provide a frameworks/middleware 318, while others may provide such a layer, Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H264, MP3, AAC, AMR, IPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 (also sometimes referred to as middleware) provide a higher-level common infrastructure that may be used by the applications 316 and/or other software components/modules. For example, the frameworks/middleware 318 may provide various graphic user interface ((QUI) functions, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party, applications 340 may include any application developed using the ANDROID™ or IOS™ software development kit (SDK) by an entity other than the vendor of the particular platform, and may be mobile software running on a mobile operating system such as IDS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (operating system 302 in FIG. 3) and typically, although not always, has a virtual machine monitor 360, which manages the operation of the virtual machine 310 as well as the interface with the host operating system (i.e., operating system 302). A software architecture executes within the virtual machine 310, such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
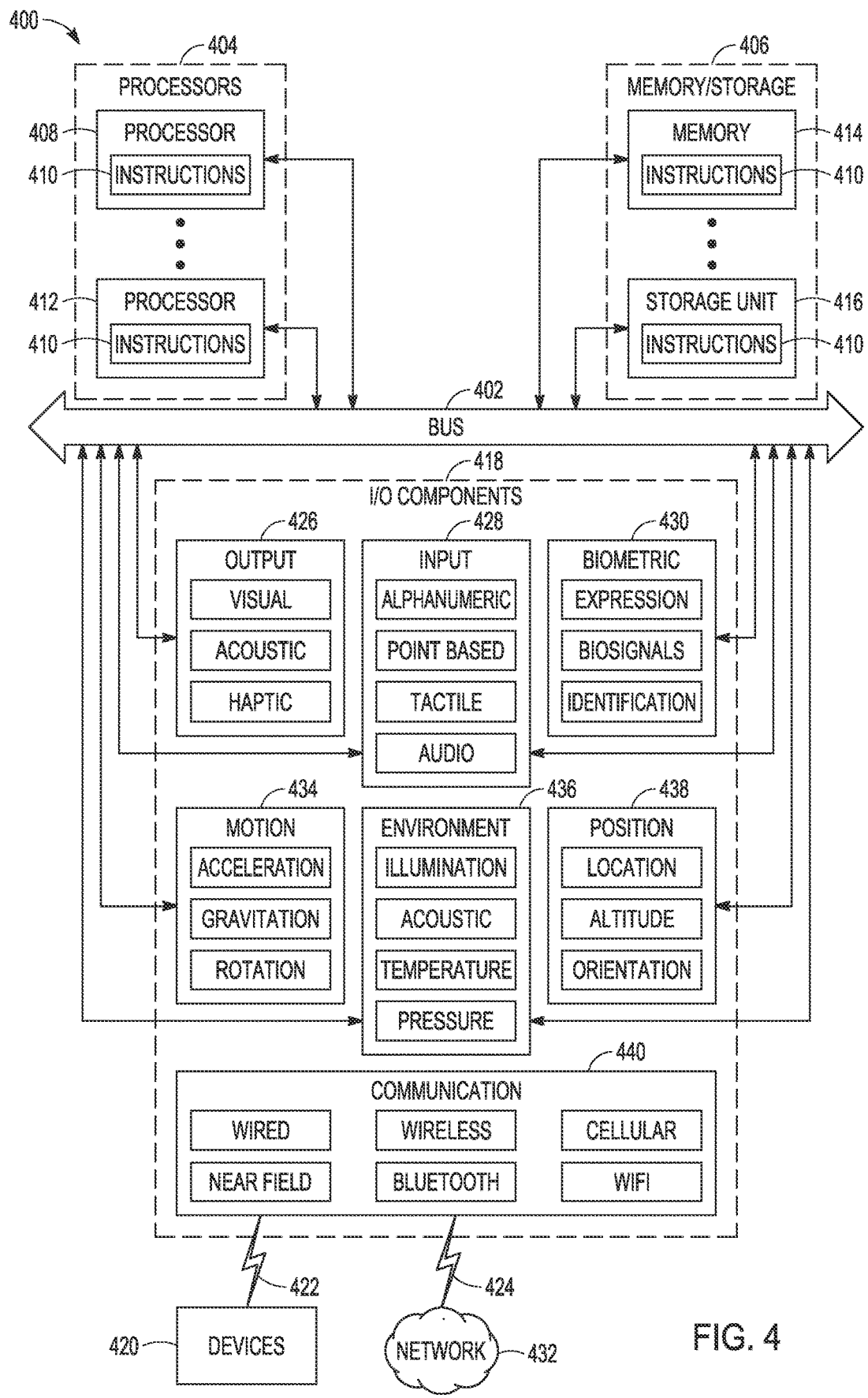
FIG. 4 is a diagrammatic representation of a machine in the form of a computer system within which a set of instructions may be executed for causing the machine to perform any one or more of the methodologies discussed herein, in accordance with some example embodiments.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general non-programmed machine into a particular machine programmed to carry out the specific described and illustrated functions in the manner described.

In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404, memory/storage 406, and components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion and the grouping is in no way limiting. In various example embodiments, the I/O components 418 may include output components 426 and input components 428. The output components 426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical, keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438 among a wide array of other components. For example, the biometric components 430 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Position System (GPS) receiver component), altitude sensor components (e.g.; altimeters or barometers that detect air pressure from which altitude may be derived); orientation sensor components (e.g.; magnetometers), and the like.

Communication may be implemented using a wide variety of technologies. The I/O components 418 may include communication components 440 operable to couple the machine 400 to a network 432 or devices 420 via a coupling 424 and a coupling 422 respectively. For example, the communication components 440 may include a network interface component or another suitable device to interface with the network 432, In further examples, the communication components 440 may include wired communication components, wireless communication components, cellular communication components. Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifier; or include components operable to detect identifiers. For example, the communication components 440 may include Radio Frequency identification (MD) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged. audio signals). In addition, a variety of information may be derived via the communication components 440, such as location via Internet Protocol (IP) geolocation, location via Wi-Fi® signal triangulation, location via detecting an NFC beacon signal that may indicate a particular location, and so forth.

In this example, the systems and methods are described in the general context of computer program instructions executed by one or more computing devices that can take the form of a traditional server/desktop/laptop; mobile device such as a smartphone or tablet; etc. Computing devices typically include one or more processors coupled to data storage for computer program modules and data. Key technologies include, but are not limited to, the multi-industry standards of Microsoft and Linux/Unix based Operating Systems; databases such as SQL Server, Oracle, NOSQL, and DB2; Business Analytic/Intelligence tools such as SPSS. Cognos, SAS, etc.; development tools such as Java, NET Framework (VB.NET, ASP.NET, AJAX.NET, etc.); and other e-commerce products, computer languages, and development tools, Such program modules generally include computer program instructions such as routines, programs, objects, components, etc., for execution by the one or more processors to perform particular tasks, utilize data, data structures, and/or implement particular abstract data types. While the systems, methods, and apparatus are described in the foregoing context, acts and operations described hereinafter may also be implemented in hardware.

Figure 5:
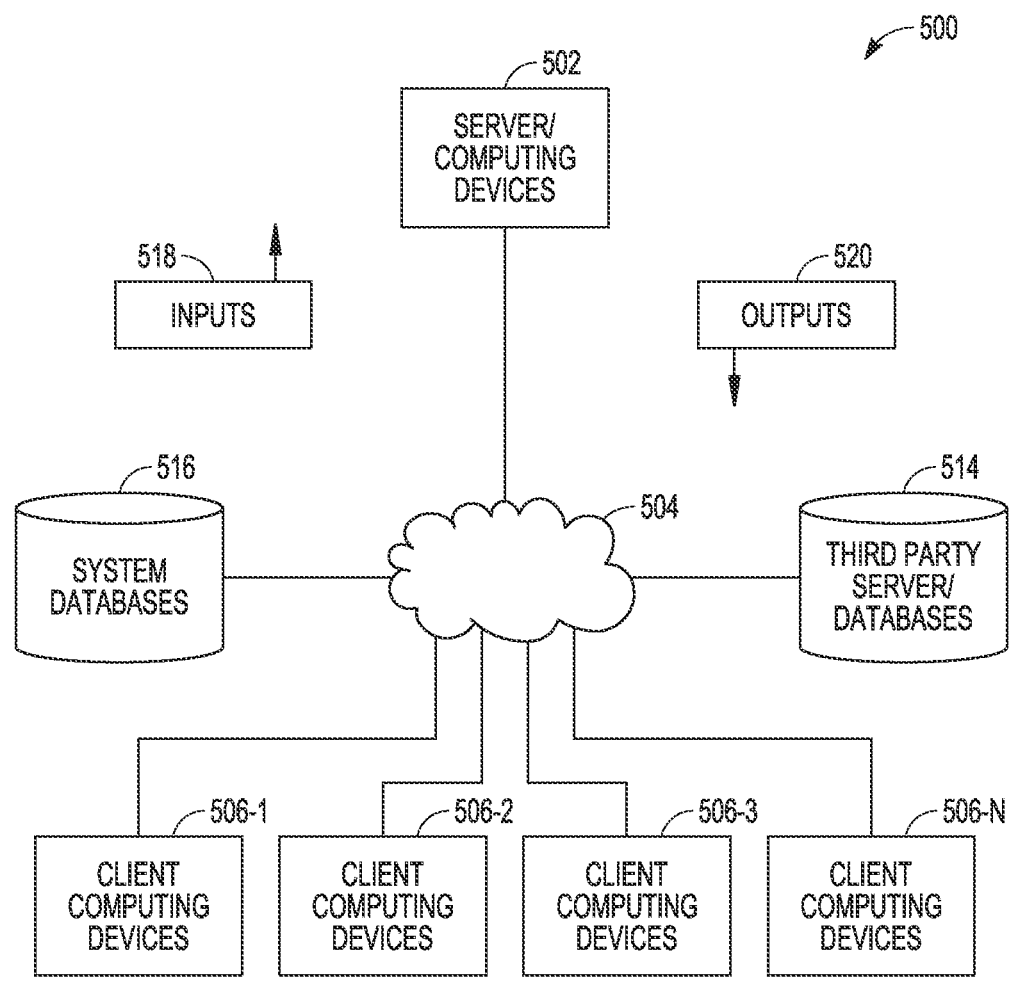
FIG. 5 illustrates a system in accordance with some example embodiments.

FIG. 5 shows a block diagram of another exemplary system 500 for management of an advertising exchange using email data according to one embodiment. In this exemplary implementation, system 500 may include one or more servers/computing devices 502 (e.g., server 1, server 2, . . . , server n) operatively coupled over network 504 to one or more client computing devices 506-1 to 506-*n*, which may include one or more consumer computing devices, one or more provider computing devices, one or more remote access devices, etc. The one or more servers/computing devices 502 may also be operatively connected, such as over a network 504, to one or more third-party servers/databases 514 (e.g., database 1, database 2, . . . , database n). The one or more servers/computing devices 502 may also be operatively connected, such as over a network 504, to one or more system databases 516 (e.g., database 1, database 2, . . . , database n), Various devices may be connected to the system 500, including, but not limited to, client computing devices, consumer computing devices, provider computing devices, remote access devices, etc. The system 500 may receive inputs 518 and outputs 520 from the various computing devices, servers and databases.

Server/computing device 502 may represent, for example, any one or more of a server, a general-purpose computing device such as a server, a personal computer (PC), a laptop, a smart phone, a tablet, and/or so on. Networks 504 represent, for example, any combination of the Internet local area network(s) such as an intranet, wide area network(s), cellular networks, WiFi networks, and/or so on. Such networking environments are commonplace in offices, enterprise-wide computer networks, etc. Client computing devices 506, which may include at least one processor, represent a set of arbitrary computing devices executing application(s) that respectively send data inputs to server/computing device 502 and/or receive data outputs from server/computing device 502. Such computing devices include, for example, one or more of desktop computers, laptops, mobile computing devices (e.g., tablets, smart phones, human-wearable device), server computers, and/or so on. In this implementation, the input data comprises, for example, real-time campaign data, audience profile, attribution data, and/or so on, for processing with server/computing device 502. In one implementation, the data output includes, for example, entails, templates, forms, and/or so on. Embodiments of the present disclosure may also be used for collaborative projects with multiple users logging in and performing various operations on a data project from various locations. Embodiments of the present disclosure may be web-based, smart phone-based and/or tablet-based or human-wearable device based.

In this exemplary implementation, server/computing device 502 includes at least one processor coupled to a system memory 604. System memory 604 may include computer program modules and program data.

Figure 6:
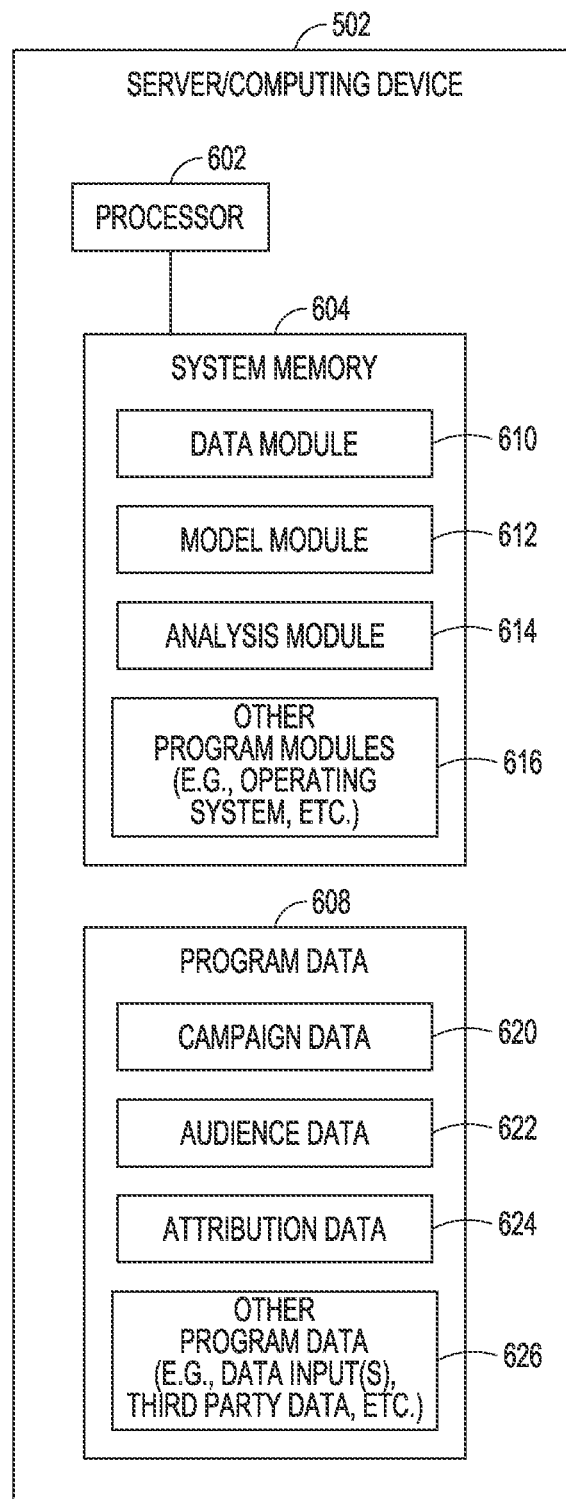
FIG. 6 illustrates a server/computing device in accordance with some example embodiments.

In this exemplary implementation, server/computing device 502 includes at least one processor 602 coupled to a system memory 604, as shown by the block diagram in FIG. 6, System memory 604 may include computer program modules and program data 608. In this implementation program modules may include data module 610, model module 612, analysis module 614, and other program modules 616 such as an operating system, device drivers, etc. Each module 610 through 616 may include a respective set of computer-program instructions executable by processor(s) 602. This is one example of a set of program modules, and other numbers and arrangements of program modules are contemplated as a function of the particular arbitrary design and/or architecture of server/computing device 502 and/or system 500 (FIG. 5). Additionally, although shown on a single server/computing device 502, the operations associated with respective computer-program instructions in the program modules could be distributed across multiple computing devices. Program data 608 may include campaign data 620, audience data 622, attribution data 624, and other program data 626 such as data input(s), third-party data, and/or others.

In some embodiments, the advertising exchange management system 106 can include a text generation server that determines what creative elements to place in the available inventory for the various audiences in the campaigns. It should be understood that traditional advertisements are comprised of an image component and an accompanying text component. Traditionally, the text is a small portion placed around the image creative to appear to the end consumer. In some embodiments, there are pre-programmed image and text combinations and the creative selector selects the best combination for the given audience/context of the webpage that the inventory is on. In these embodiments, the program data designates the likely creative elements— image and text—to insert.

In some embodiments, a deep neural network generates custom messages to correspond to given creative images to maximize resonance with the target audience segment.

In FIG. 6, the data module 610 collects data, such as past advertisement images (creatives), accompanying text, and real-world feedback of image/text combinations such as click throughs, conversions, and other metrics of user engagement, etc. and can be collated with audience data (e.g., demographic data of the audience). This collected data can be stored in the program data 608. The model module 612 then builds a training data set from the collected data and trains neural networks of FIGS. 7-9. In various embodiments, the model module 612 may programmatically update and or build new training data sets in response to new data collected by the data module 610. For example, newly generated advertisements and accompanying test, feedback for the new advertisements and text, and new and or updated audience data captured by the data module 610 may be added to existing training data sets and or included in new training data sets generated by the model module 612. The neural networks of FIG. 7-9 may be continuously retrained on the new and or updated datasets to improve the predictive performance of the networks.

The analysis module 614 is a software component that automates formatting inputs, generating the intermediate audience and creative representations, and passing the intermediate transformations through the neural networks and reports the result to the end user. It provides a high-level interface for advertisers to use the trained networks. From the advertiser's perspective, they would specify the sets of creatives and audiences targeted by an ad campaign, and the system would provide them with high-performing, text to accompany each pair of creative and audience. In the background, the analysis module 614 transforms the advertisers' specifications into a format that is usable by the networks, passes each (creative, audience) pair through the networks, and then returns the creative text for each combination to the user.

The campaign data 620 includes data about audience response to previous images and text combinations. The audience data 622 includes data about the audience such as demographic data (age, gender, offline versus online shoppers, and/or pet owner, etc.) corresponding to the campaign data 620 (e.g., a click through for a specific image/text combination had this demographic data). The attribution data 624 includes data about conversions (e.g., signing up for a newsletter, making a purchase, viewing a video, clicking on or through an image/text combination, etc.) and can be used as additional input into the training data.

Accordingly, the device 502 enables the training of the neural networks so that a viewer will not only be more likely to click on an image/text combination but will be more likely to convert (e.g., purchase, subscribe, etc.). That is, not just an empty click but a click that converts.

Figure 7:
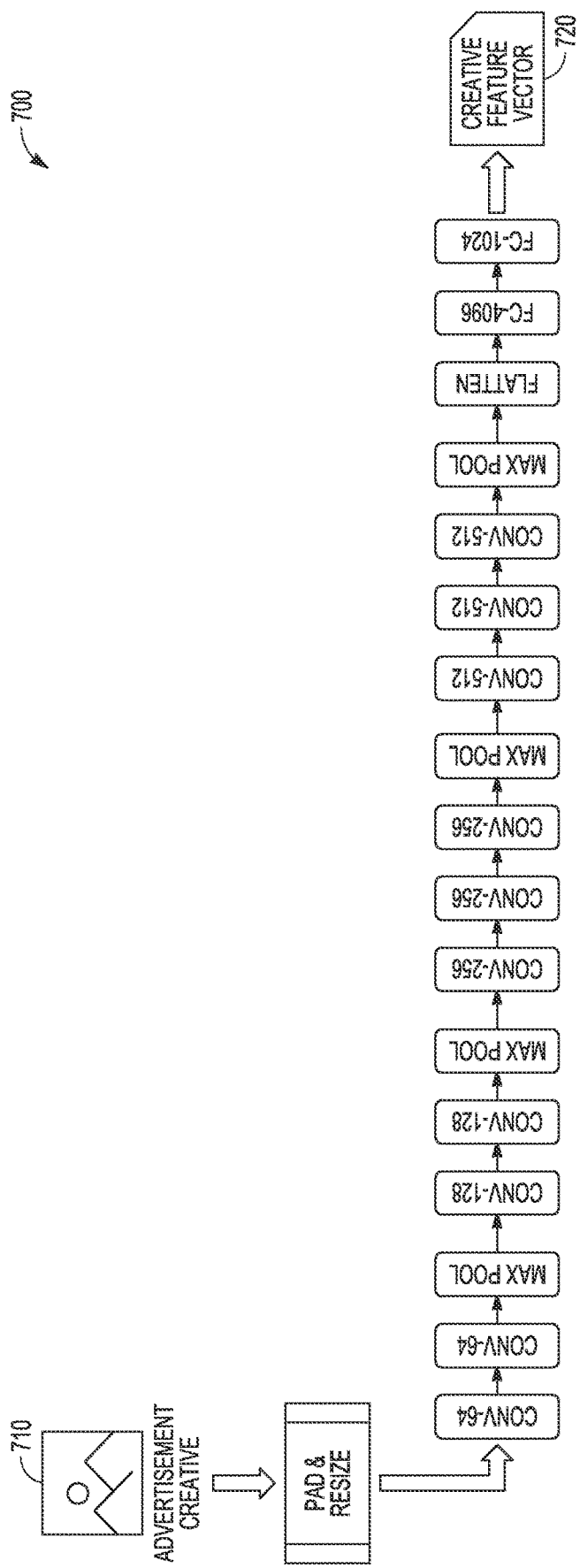
FIG. 7 illustrates a creative feature vector generator in accordance with some example embodiments.
Figure 8:
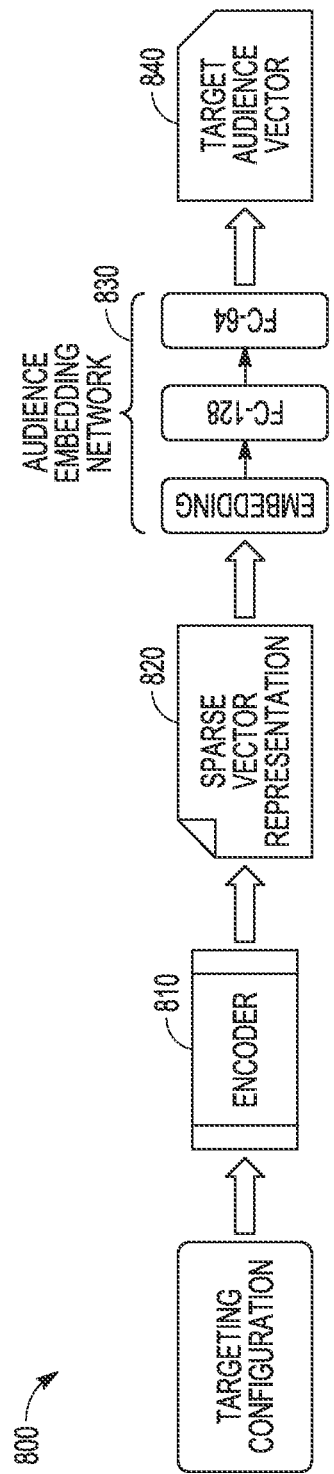
FIG. 8 illustrates a target audience vector generator in accordance with some example embodiments.
Figure 9:
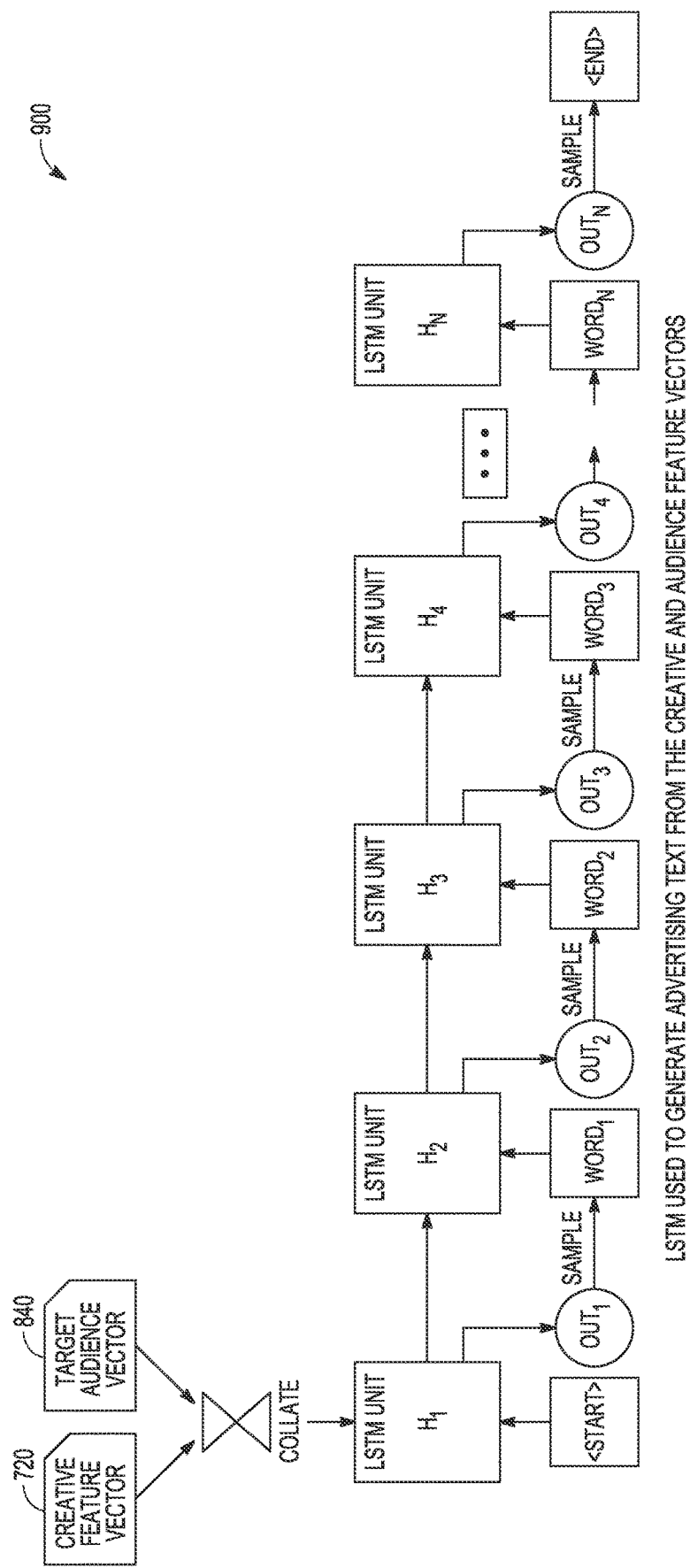
FIG. 9 illustrates a text generator in accordance with some example embodiments.

The network architecture of FIGS. 7-9 comprise a convolutional neural network (CNN) that learns to transform a given creative image into a useful feature vector, a feed-forward network that learns a representation for the target audience, and a recurrent neural network that uses long short-term memory units to generate text conditioned on the outputs from the CNN and the audience embedding network. The neural network of FIG. 7 takes the creative image as input and passes it through a series of stacked convolutional and pooling layers and outputs a feature vector that represents the content of the creative. The audience-embedding network of FIG. 8 takes as input the targeted audience description (e.g. age, gender, location, etc.). It should be appreciated that the target audience description may be audience segments, personal information, demographic information, interest information, recent browsing patterns, recent television viewing, or be based on any ideal information as determined by the system. The audience-embedding network outputs a feature vector that represents the target audience. The feature vectors from the CNN and the audience-embedding network are concatenated and passed as input to the recurrent network in FIG. 9 alongside a special start token.

FIG. 7 illustrates a creative feature vector generator in accordance with some example embodiments. As depicted in FIG. 7, a convolutional neural network 700 is used to transform a creative 710 (raw image—an array of pixels) to a creative feature vector 720, which is a lower dimensional representation of the original image 710. For example, an image with many pixels and color channels/pixel can be reduced to 1,024 numbers. The trained network 700 is trained to produce the vector 720 that is most useful for later processing the data collected and stored in the program data 608.

FIG. 8 illustrates a target audience vector generator 800 in accordance with some example embodiments. As shown in FIG. 8, a targeting configuration specified by an advertiser (e.g., audience specification such as males between age 20 and 30 or any other demographic specifications for an advertising campaign) is input to an encoder 810, which translates the targeting configuration into a numerical representation—a sparse vector 820. For example, the encoder 810 may map the targeting configuration to one or more numerical values in a feature space specific to audience segmentation. The sparse vector representation 820 is then passed to an audience embedding network 830 resulting in a target audience vector 840. The audience embedding network 830 may include multiple layers configured to progressively reduce the dimensionality of the sparse vector representation 820 with minimal data loss. For example, the audience embedding network may include a trained embedding layer, a first fully connected layer that outputs a vector including 128 numerical values, and a second fully connected layer that outputs a vector including 64 numerical values. Accordingly, the target audience vector 840 is a numeric representation of the targeting configuration at a lower dimensionality with higher information density.

FIG. 9 illustrates a text generator 900 in accordance with some example embodiments. The generator 900 is trained based on the data sets created by the model module 612. The outputs of the creative feature vector generator 700 and target audience vector generator 800 (i.e., creative Feature Vector 720 and Target Audience Vector 840) are both passed through a Long Short-Term Memory (LSTM) units, e.g., a series of LSTMs H1, H2, H3, H4, . . . Hn, to generate advertising text from the creative and audience feature vectors. The LSTM network may be any type of recurrent neural network.

The vectors 720 and 840 are concatenated and then passed to the recurrent network. Each LSTM unit in the recurrent network generates a token, which can either be a start token (signifying the beginning of a text), a word (generated in sequential order so that a sentence may be grammatically correct), or an end token (indicating the end of the text sequence). The output of each LSTM unit is fed into the next LSTM unit in sequence, e.g., from LSTM H1 to LSTM H2, until an LSTM unit generates an end token.

Each of the long short-term memory units generates a token by first producing a distribution over an advertiser's vocabulary (e.g., generated by the system 106) and then drawing a random sample from the distribution to obtain the next word in the marketing message. The advertiser's vocabulary includes the set of words that the system 106 has encountered in the advertiser's historical data, possibly augmented with a set of common words from the advertiser's vertical or from the advertiser's native language. (For example, the word "the" can be included even if doesn't appear in historical data), This process of generation and sampling is repeated iteratively until a special end token is sampled. The sequence of words between the start and end token will be a dynamically generated marketing message specific to the target audience and selected image.

The model(s) are trained using past advertisements, e.g., data collected by the data module 610 and stored in the program data 608. The advertising image and target audience definitions are fed into the neural network and embedding layer. The advertiser's handcrafted text(s) appearing the past advertisements are used as the training label. In various embodiments, past text generated by the text generator 900 may also be included in the training data set used to train the LSTM units. Each human and/or machine generated historical example is weighted by the positive events observed in feedback for the historical examples to maximize the positive events. It should be understood that positive events include hovering, click-through, conversion, subsequent purchase wherein the view is attributed as part of the purchase journey, or any other targeted behavior or event.

In a hypothetical scenario, an advertiser runs a campaign that targets a plurality of audience segments. The campaign has a plurality of creative images including various images, sizes, placements, etc. It should be understood that creative image variables need not be so limited and may include different colors, aspect ratios, resolutions, image components, and the like. When placing the creative in the available inventory, the trained generator 900 used the generated vectors 720 and 840 to generate accompanying text word by word in real-time using the above methodologies.

For illustrative purposes, the text generator 900 would analyze a given image to parse the details. An image may have components such as sand, water, palm trees and the text generator would parse the image as being a beach. The text generator 900 would also process information about the target audience. Target audience may be broken up by generation (genZ, millennials, genX, boomers, etc.) and the text generator may automatically generate copy for phrases that are most likely to target these groups. For example, the text generator may find or discover that current slang like "boujee" or "dank" or "flex" appeals to the genZ audience, but such trendy creations should be avoided when targeting a member of the boomer generation. Alternatively, the system may determine that phrases using current slang do not appeal to genZ and instead is perceived as off-putting pandering. In this case, the system will learn to avoid generating these types of words/phrases in the text component. It should be understood that the audience segments may be generational, age, gender, household income as well as more complex segments such as sentiment or psychographic preference.

Figure 10:
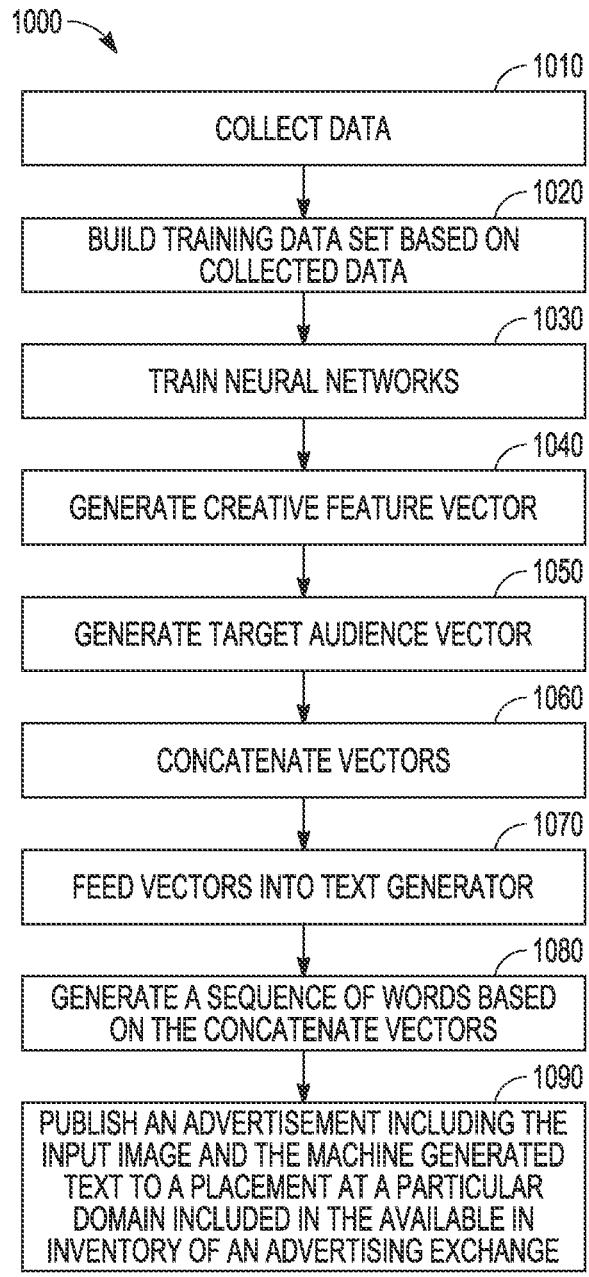
FIG. 10 illustrates a flowchart of method in accordance with some example embodiments.

FIG. 10 illustrates a flowchart of method 1000 in accordance with some example embodiments. Data is collected at block 1010 as described above. Next, training data sets are built (1020) and used for training (1030) the neural networks 700, 830 and 900. Once the neural networks are trained, a creative feature vector 720 and target audience vector 840 can be created (1040 and 1050) as discussed above. These vectors 720 and 840 are then concatenated (1060) and fed into the text generator (1070) comprising a recurrent neural network, which then generates (1080) a sequence of words based on the concatenated vectors. The sequence along with the corresponding image from which the creative feature vector 720 was generated can then be distributed to the target audience from which the target audience vector 840 was generated. Distribution can be via email, advertisement, etc. on any electronic device. Alternatively, the sequence can be published (1090) as an advertisement including the input image and the machine generated text to a placement at a particular domain included in the available inventory of an advertising exchange.

Other applications besides advertisements may be content recommendation, e.g., an image of a database (or other media, such as a books in e-readers or video recommendations in streaming services, product recommendations in e-commerce, etc) with accompanying text so as to encourage a user to access the database. This will increase the speed of transmission of relevant data from the database since a user will more likely to click the database instead of another database that may not be relevant—thereby saving bandwidth and providing data needed. Further, less operations will need to be performed to send the relevant data instead of sending irrelevant and relevant data thereby saving bandwidth.

Further, after transmitting the creative and the text, it can be subjected to A/B testing and/or other testing to verify the accuracy of the trained networks and retrain the networks (update the training data sets and retrain the networks) as needed.

As used herein, a database may be a relational database, flat file database, relational database management system, object database management system, operational database, data warehouse, hyper media database; post-relational database, hybrid database models. RDF database, key value database, XML database, XML store, text file, flat file or other type of database.

Although not required, the systems and methods are described in the general context of computer program instructions executed by one or more computing devices that can take the form of a traditional server/desktop/laptop; mobile device such as a smartphone or tablet; etc. Computing devices typically include one or more processors coupled to data storage for computer program modules and data. Key technologies include, but are not limited to, the multi-industry standards of Microsoft and Linux/Unix based Operation Systems; databases such as SQL Server, Oracle, NOSQL, and DB2; Business analytic/Intelligence tools such as SPSS, Cognos, SAS, etc.; development tools such as Java, NET framework (VB.NET, ASP.NET, AJAX.NET, etc.); and other e-Commerce products, computer languages, and development tools. Such program modules generally include computer program instructions such as routines, programs, objects, components, etc., for execution by the one or more processors to perform particular tasks, utilize data, data structures, and/or implement particular abstract data types. While the systems, methods, and apparatus are described in the foregoing context, acts and operations described hereinafter may also be implemented in hardware.

The following examples describe various embodiments of methods, machine-readable media, and systems (e.g., machines, devices, or other apparatus) discussed herein.

1. A method, comprising:
collecting data including combinations of images and accompanying text and user feedback of the combinations;
building training data sets based on the collected data;
training a plurality of neural networks using the training data;
generating a creative feature vector based on a specified image using a first network of the trained plurality of neural networks;
generating a target audience vector based on a specified target audience using a second network of the trained plurality of networks;
generating a sequence of words based on the vectors using a third network of the plurality of trained neural networks; and
transmitting the generated sequence of words and the specified image to the target audience over a network.

2. The method of example 1, wherein the user feedback includes click throughs and conversions.

3. The method of any of the preceding examples, further comprising collecting audience data for the combinations and further training the plurality of neural networks based on the collected audience data.

4. The method of any of the preceding examples, wherein the third neural network is a recurrent neural network.

5. The method of any of the preceding examples, wherein the third neural network comprises a series of long short-term memory units.

6. The method of any of the preceding examples, wherein an input to the first long short-term memory unit in the series includes the vectors and the output of the first long short-term memory unit is the first word of the generated sequence of words.

7. The method of any of the preceding examples, wherein an input to subsequent long short-term memory units in the series are the vectors and the previous word.

8. The method of any of the preceding examples, wherein the generated creative feature vector is a lower dimensional representation of the specified image.

9. The method of any of the preceding examples, wherein the generated target audience vector is an information-dense vector representation.

10. A non-transitory computer-readable medium having stored thereon instructions to cause a computer to execute a method, the method comprising:
collecting data including combinations of images and accompanying text and user feedback of the combinations;
building training data set based on the collected data;
training a plurality of neural networks using the training data;
generating a creative feature vector based on a specified image using a first network of the trained plurality of neural networks;
generating a target audience vector based on a specified target audience using a second network of the trained plurality of networks;
generating a sequence of words based on the concatenated vectors using a third network of the plurality of trained neural networks; and
transmitting the generated sequence of words and the specified image to the target audience over a network.

11. An apparatus, comprising:
a processor; and
a non-transitory memory having stored thereon instructions to cause the processor to execute a method, the method comprising
collecting data including combinations of images and accompanying text and user feedback of the combinations;
building training data set based on the collected data;
training a plurality of neural networks using the training data;
generating a creative feature vector based on a specified image using a first network of the trained plurality of neural networks;
generating a target audience vector based on a specified target audience using a second network of the trained plurality of networks;
generating a sequence of words based on the concatenated vectors using a third network of the plurality of trained neural networks; and
transmitting the generated sequence of words and the specified image to the target audience over a network.

12. The apparatus of any of the preceding examples, wherein the user feedback includes click throughs and conversions.

13. The apparatus of any of the preceding examples, wherein the method further comprises collecting audience data for the combinations and further training the plurality of neural networks based on the collected audience data.

14. The apparatus of any of the preceding examples, wherein the third neural network is a recurrent neural network.

15. The apparatus of any of the preceding examples, wherein the third neural network comprises a series of long short-term memory units.

16. The apparatus of any of the preceding examples, wherein an input to a first long short-term memory unit in the series includes the vectors and an output of the first long short-term memory unit is a first word of the generated sequence of words.

17. The apparatus of any of the preceding examples, wherein an input to subsequent long short-term memory units in the series is the vectors and the previous word.

18. The apparatus of any of the preceding examples, wherein the generated creative feature vector is a lower dimensional representation of the specified image.

19. The apparatus of any of the preceding examples, wherein the generated target audience vector is an information-dense vector representation.

20. The apparatus of any of the preceding examples, wherein the method further comprising:
conducting A/B testing on the transmitted sequence of words and specified image;
updating the training data set based on results of the A/B testing; and retraining the plurality of neural networks accordingly.

Although the subject matter has been described with reference to some specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, comprising:
    collecting data including combinations of images and accompanying text and user feedback of the combinations;
    building training data sets based on the collected data;
    training a plurality of neural networks using the training data;
    generating a creative feature vector based on a specified image using a first network of the trained plurality of neural networks;
    generating a target audience vector based on a specified target audience using a second network of the trained plurality of networks;
    generating a sequence of words based on the vectors using a third network of the plurality of trained neural networks; and
    transmitting the generated sequence of words and the specified image to the target audience over a network.

2. The method of claim 1, wherein the user feedback includes click throughs and conversions.

3. The method of claim 1, further comprising collecting audience data for the combinations and further training the plurality of neural networks based on the collected audience data.

4. The method of claim 1, wherein the third neural network is a recurrent neural network.

5. The method of claim 1, wherein the third neural network comprises a series of long short-term memory units.

6. The method of claim 5, wherein an input to a first long short-term memory unit in the series includes the vectors and an output of the first long short-term memory unit is the first word of the generated sequence of words.

7. The method of claim 6, wherein an input to subsequent long short-term memory units in the series are the vectors and a previous word.

8. The method of claim 1, wherein the generated creative feature vector is a lower dimensional representation of the specified image.

9. The method of claim 1, wherein the generated target audience vector is an information-dense vector representation.

10. A non-transitory computer-readable medium having stored thereon instruction to cause a computer to execute a method, the method comprising:
    collecting data including combinations of images and accompanying text and user feedback of the combinations;
    building training data set based on the collected data;
    training a plurality of neural networks using the training data;
    generating a creative feature vector based on a specified image using a first network of the trained plurality of neural networks;
    generating a target audience vector based on a specified target audience using a second network of the trained plurality of networks;
    generating a sequence of words based on a concatenated vectors using a third network of the plurality of trained neural networks; and
    transmitting the generated sequence of words and the specified image to the target audience over a network.

11. An apparatus, comprising:
    a processor; and
    a non-transitory memory having stored thereon instructions to cause the processor to execute a method, the method comprising
    collecting data including combinations of images and accompanying text and user feedback of the combinations;
    building training data set based on the collected data;
    training a plurality of neural networks using the training data;
    generating a creative feature vector based on a specified image using a first network of the trained plurality of neural networks;
    generating a target audience vector based on a specified target audience using a second network of the trained plurality of networks;
    generating a sequence of words based on a concatenated vectors using a third network of the plurality of trained neural networks; and
    transmitting the generated sequence of words and the specified image to the target audience over a network.

12. The apparatus of claim 11, wherein the user feedback includes click throughs and conversions.

13. The apparatus of claim 11, wherein the method further comprises collecting audience data for the combinations and further training the plurality of neural networks based on the collected audience data.

14. The apparatus of claim 11, wherein the third neural network is a recurrent neural network.

15. The apparatus of claim 11, wherein the third neural network comprises a series of long short-term memory units.

16. The apparatus of claim 15, wherein an input to a first long short-term memory unit in the series includes the vectors and an output of the first long short-term memory unit is a first word of the generated sequence of words.

17. The apparatus of claim 16, wherein an input to subsequent long short-term memory units in the series is the vectors and a previous word.

18. The apparatus of claim 11, wherein the generated creative feature vector is a lower dimensional representation of the specified image.

19. The apparatus of claim 11, wherein the generated target audience vector is an information-dense vector representation.

20. The apparatus of claim 11, wherein the method further comprising:
- conducting A/B testing on the transmitted sequence of words and the specified image;
- updating the training data set based on results of the A/B testing; and
- retraining the plurality of neural networks accordingly.

* * * * *